(12) United States Patent
Mugica et al.

(10) Patent No.: US 7,003,774 B2
(45) Date of Patent: Feb. 21, 2006

(54) MULTIDIMENSIONAL ADVANCED ADAPTIVE SOFTWARE ARCHITECTURE

(75) Inventors: Antonio Mugica, Boca Raton, FL (US); Carlos Alonso, Caracas (VE); Lino Iglesias, Caracas (VE)

(73) Assignee: Smartmatic, Boca Raton, FL (US)

(*) Notice: Subject to any disclaimer, the term of this patent is extended or adjusted under 35 U.S.C. 154(b) by 516 days.

(21) Appl. No.: 09/682,065

(22) Filed: Jul. 16, 2001

(65) Prior Publication Data

US 2003/0014560 A1    Jan. 16, 2003

(51) Int. Cl.
  *G06F 3/00*   (2006.01)
  *G06F 9/44*   (2006.01)
  *G06F 9/46*   (2006.01)
  *G06F 13/00*  (2006.01)

(52) U.S. Cl. .................. 719/313; 719/310; 717/114

(58) Field of Classification Search ........ 719/310–320, 719/328–330; 717/100–119
See application file for complete search history.

(56) References Cited

U.S. PATENT DOCUMENTS

| | | | | |
|---|---|---|---|---|
| 5,893,106 | A * | 4/1999 | Brobst et al. | 707/102 |
| 6,106,569 | A * | 8/2000 | Bohrer et al. | 717/100 |
| 6,438,617 | B1 * | 8/2002 | Savitzky et al. | 719/316 |
| 2004/0060036 | A1 * | 3/2004 | Natori et al. | 717/100 |

OTHER PUBLICATIONS

Nierstrasz et al, Component-Oriented Software Development, Communications of the ACM, Sep. 1992, vol. 35, No. 9, pp. 160-165.*
Hartman et al, Taking an Object-Oriented Methodology into the Real World, OOPSLA, 1994, pp. 25-30.*
Mambella et al, An Integrated Approach to Software Reuse Practice, ACM, 1995, pp. 63-71.*
Schmidt et al, Developing Flexible and High-performance Web Servers with Frameworks and Patterns, ACM, 2000, pp. 1-9.*

* cited by examiner

*Primary Examiner*—Meng-Al T. An
*Assistant Examiner*—Diem Cao
(74) *Attorney, Agent, or Firm*—Jeffrey Furr (57) ABSTRACT

The present invention is a software architecture that provides high versatility and performance. This architecture is composed of two dimensions: the first one belongs in the application level, and the second in the multicore dimension. The application dimension is related to the different applications based in the conceptual model of abstractions exposed in this patent. The multicore dimension is related to the applications dimension instantiated several times in the same computer (multiple processors) or in several computers. All the cores within the multicore dimension are related in order to share information and integrate all the architecture''s applications. The multicore architecture avoids bottlenecks in the simultaneous execution of multiple applications on the same computer by means of a large virtual core composed of small interconnected cores. The conceptual model of abstractions is composed of various drivers, abstraction layers and a unique core that provides support by playing a referee role between different extensions of an application.

9 Claims, 6 Drawing Sheets

MULTIDIMENSIONAL ADVANCED ADAPTIVE SOFTWARE ARCHITECTURE

BACKGROUND OF INVENTION

The present invention relates to the field of software architecture. Still more particularly, the present invention proposes a new architectural way to structure software.

DISCUSSION OF PRIOR ART

A software development process or life cycle must follow several project guidelines that provides orientation to it. One of these major guidelines is the software architecture that implements a system. Software architecture is the most relevant part designing a software solution for a specific problem, it implies a whole idea of software''s structure, and how it works in ideal conditions. The architecture of a software system indicates the structural blocks that compose a system, such as the interaction among them. This in broad strokes includes the general functionality of the system. In the past there have existed a great number of architectures that have derived from advances and discoveries in software area in a specific time. For example, architectures based on software modules. These architectures divided software in specific interconnected parts and in certain way each part has knowledge of the functions that carried out the others in order to accomplish a task altogether. This approach is a really bad technique because software reuse is reduced to a minimum degree. Each one of these parts consisted of one or several libraries of functions with a limited degree of software reusability, if any at all. These architectures were based generally on the paradigm of Mainframe-Terminal (then, the independency of the terminal was none, it used to depend totally on the mainframe) and finally on schemes like client-server (no hot plug applications, software reuse, high degrees of scalability existed at that time). With the appearance of the object-oriented programming paradigm, the way to make software was revolutionized. Several new concepts were introduced helping to simplify the development life cycle of a project, making it easier, faster and simpler than previous life cycles. At this moment, concepts like abstraction, encapsulation, polymorphism were born, and the client-server schemes began to have greater popularity and use, evolving from two layer schemes (data and logic-interface) towards three layer schemes (data, logic and interface), facilitating maintenance tasks. Three layer schemes have been fortified with the development of software component paradigm that helps to construct and place the middle tier (logic) in a distributed way on a network (COM+, Java Beans), which doesn''t introduce new software architectures, but gives support to traditional and common n-tier architectures, providing a distributed execution environment.

All these concepts have been evolving with a common north in mind: software reusability and versatility. Hence the need to create an architecture that is dynamic and implementable, in which changes to hardware and software (terminal devices) cause no changes in the architectural essential components.

SUMMARY OF INVENTION

The present invention is a software architecture that provides high versatility and performance. This architecture is composed of two dimensions: the first one belongs in the application level, and the second in the multicore dimension. The application dimension is related to the different applications based in the conceptual model of abstractions exposed in this patent. The multicore dimension is related to the applications dimension instantiated several times in the same computer (multiple processors) or in several computers. All the cores within the multicore dimension are related in order to share information and integrate all the architecture''s applications. The multicore architecture avoids bottlenecks in the simultaneous execution of multiple applications on the same computer by means of a large virtual core composed of small interconnected cores. The conceptual model of abstractions is composed of various drivers, abstraction layers and a unique core that provides support by playing a referee role between different extensions of an application.

OBJECTS AND ADVANTAGES

Accordingly, several objects and advantages of our invention are:

a)Greater Modularity in software architecture. It''s possible to replace one layer of the architecture with another of same functionality with no impact over the entire application.

b)Higher performance on multiple applications running on the same computer or different computers with multiple interconnected cores. This approach minimizes bottlenecks in software execution, preventing different applications from executing on the same centralized core.

c)No need to recompile or change code in the application when the front end or back end or control end (interface, DBMS, control net) is changed.

d)Reduce the amount of software changes in order to support different Platforms related to extensions. Provides a high modularity and scalability. All the modules are likely to change preserving the control logic (core) intact.

e)Greater dynamic integration. Relating several applications using core relationships, facilitating interapps core integration on cooperative tasks. All application cores are capable to send messages between them on the same computer or across a network.

f)Provides extra flexibility in hardware-software integration and versatile hardware support to a greater extent than existing architectures. Adding support for a new device is not a problem. The tasks are reduced to a single simple module change (Driver).

g)Provides greater versatility. Adding new extensions to an application when connecting it to the application core. All extensions (interface, control network, database) are connected to a central core that coordinates all communication tasks and relationships between that extensions.

h)Highly adaptive. The architecture can adapt itself to many kinds of applications, adding software extensions to the core. For example, a data application only needs a data extension and an interface extension; a control application needs both of these and a control network extension.

i)Hot plugging of Architecture extensions. Several architecture extensions can be plugged into the CORE without shutting it down.

j)Capacity to interconnect and integrate applications through COREs and establish inter-application communication.

k)It adapts to several software paradigms. For example: Client-Server, Object oriented programming, etc.

l)Intelligence and behavior plugins. The core will manage extension interaction under the rules and logic introduced by the intelligence and behavior plugins.

DETAILED DESCRIPTION

Figure 1:
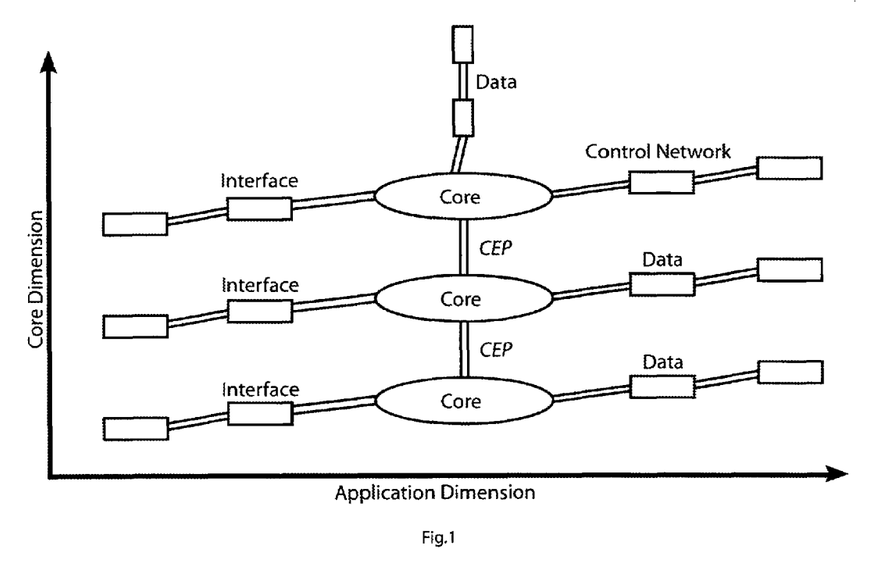
FIG. 1. Exposes the whole architecture and its respective dimensions.

MAASA is multidirectional because it has multiple dimensions (application dimension and CORE dimension) and it can include several architectural extensions attached to the same core. It is Advanced and Adaptive because it can accept various kinds of extensions in order to solve a problem or build a specific application without shutting down the resident application engine (CORE). And obviously, it is an architecture built in order to model software (FIG. 1).

The Multidimensional Advanced Adaptive Software Architecture has several related new concepts that explains a novel method to model and deploy one or more interconnected software applications. The concepts are the following ones:

Complex Organizational Referee Engine (CORE): It includes the basic layer in the MAASA architecture. The CORE acts like an arbiter. It manages information and interaction between different extensions of the architecture attached to it. CORE is a complex compound of software components that can accept different kinds of software extensions dynamically in a hot plug fashion, and exchange information with other instances of itself. It works like a software kernel.

Extension: An extension is a branch of the MAASA architecture in application dimension. It''s a set comprising an abstraction layer and a driver that perform a specific task in an application.

Abstraction Layer: It''s a software layer that hides implementation details and data structures of a specific software module. In this specific case, it hides the implementation details imposed by the driver layer associated with it.

Driver: It''s a specific software module that interfaces with a terminal device. This driver is specific for a certain terminal device.

Figure 2:
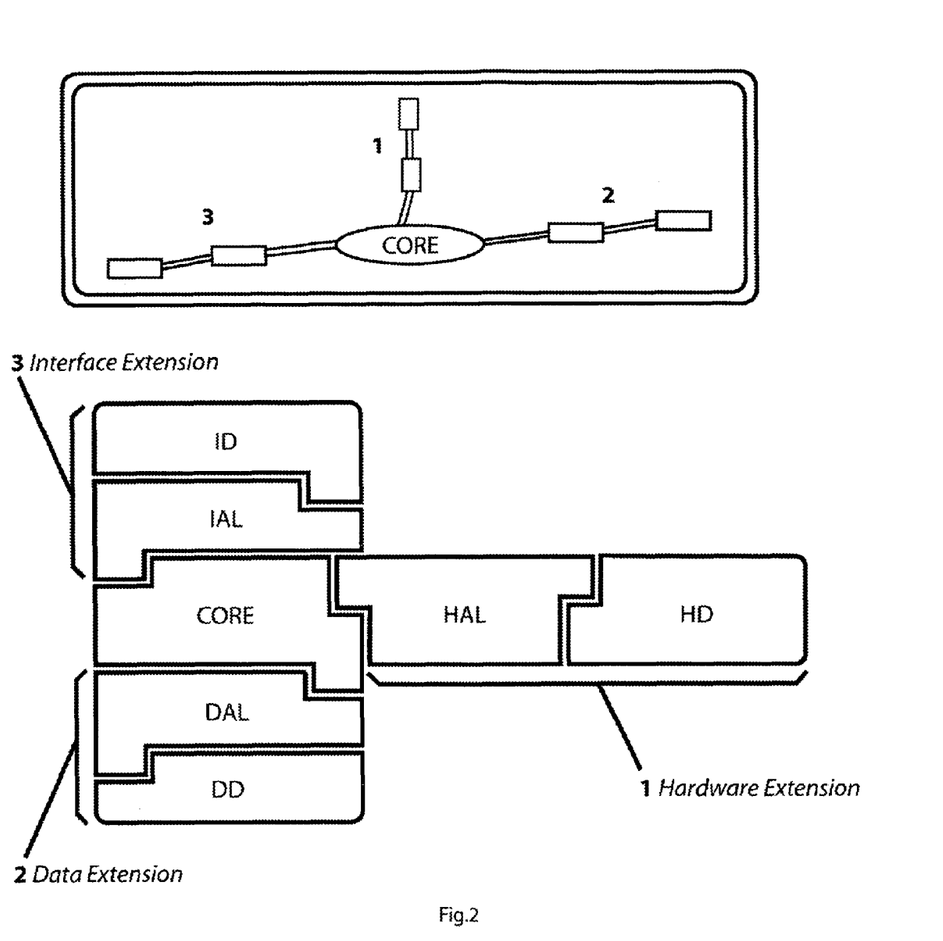
FIG. 2. An example of the application dimension inside the architectural scheme, its parts and how its parts interconnect to each other.
Figure 3:
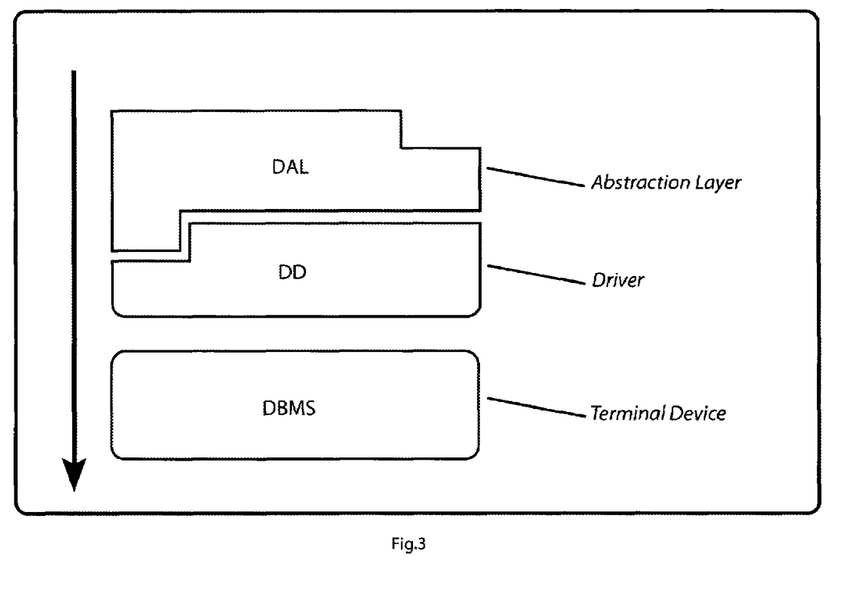
FIG. 3. An Extension example. (Data Extension)

Application Dimension: It is one of two dimensions that are involved in MAASA. It represents the dimension related to final applications implemented following the standards of the architecture. An instance of the application dimension is a set composed of a CORE and several CORE extensions performing tasks (FIG. 2).

Core Dimension: Refers to a set of COREs interconnected through a Core Exchange Pipe that provides a communication tunnel between them. By interconnecting their COREs, the core dimension groups several applications to allow information exchange and integration in a whole architecture (FIG. 1).

Figure 4:
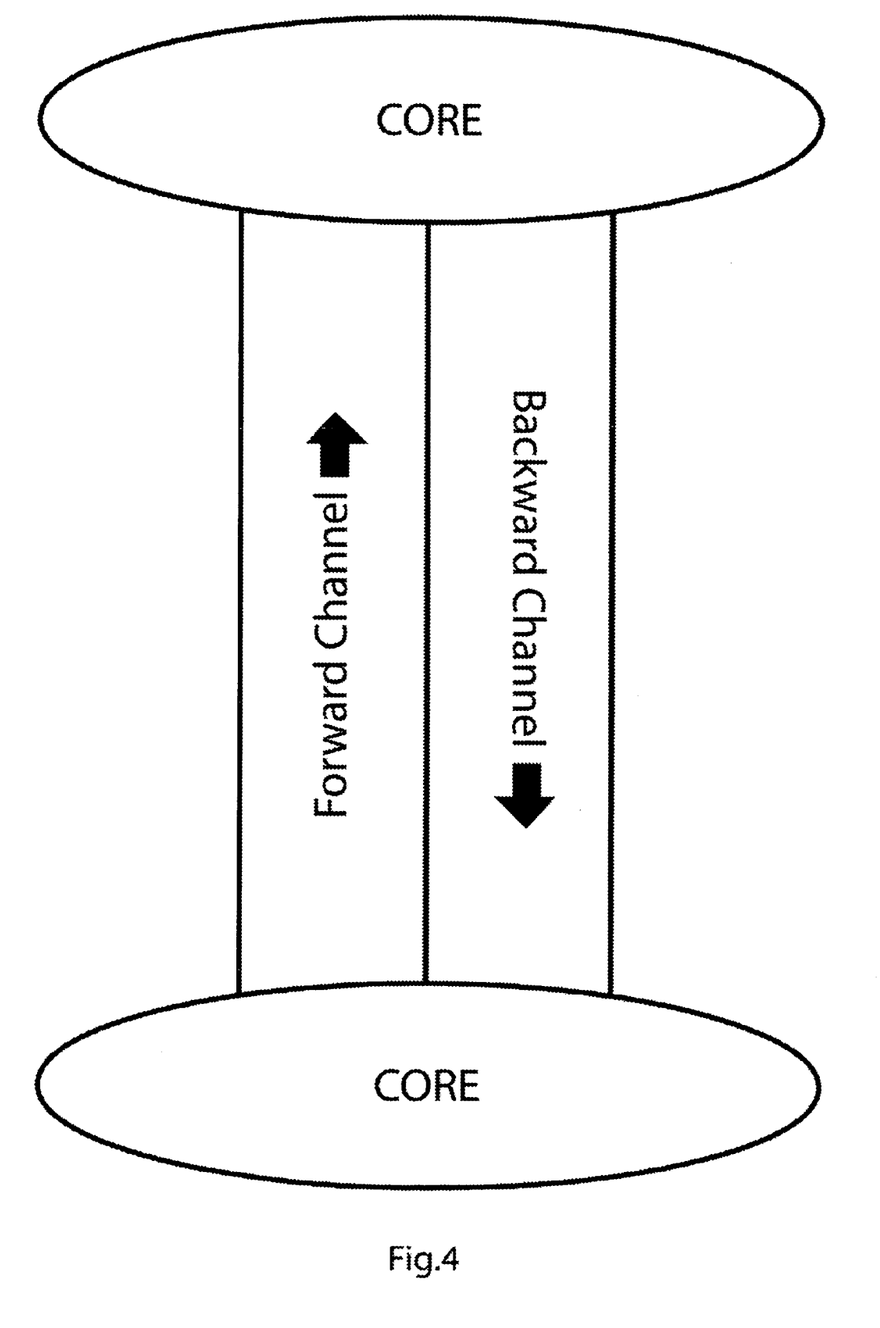
FIG. 4. Core Exchange Pipe structure.

Core Exchange Pipe: Refers to an interconnecting bi-directional communication channel that provides data exchange between various COREs (FIG. 4).Terminal Device: A terminal device refers to any kind of software, hardware device or terminal user that performs a specific activity. For example: a DBMS storing data, a Control network, etc.

The architecture is composed of several applications (application dimension). Each application includes a central core that provides a processing engine acting like an arbiter between various extensions. Several extensions are connected to a central CORE through an abstraction layer that hides the implementation and operation details of the driver under it.

Figure 5:
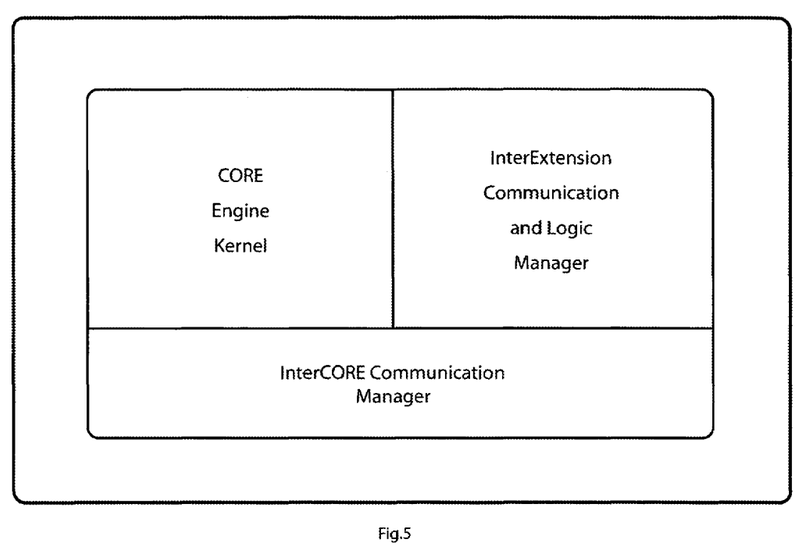
FIG. 5. Core Structure. Basic parts.

The CORE is divided into three major parts that accomplish a specific task. The three parts are: (FIG. 5)

CORE Engine kernel: Refers to kernel logic. It''s the central part of CORE. It manages task processing and scheduling, manages information exchange between the two dimensions of the architecture (applications-CORE and CORE-applications), manages the extension hot plugging mechanism, and provides intelligence to an application with a specific intelligence plugin.

InterExtension Communication & logic manager: In conjunction with the CORE Engine kernel, it manages communications between an unlimited number of extensions attached to a CORE. It routes calls from one extension to a set of extensions and handles the responses that the caller extension receives, retrying calls as needed. Also, it manages all tasks related to an extension.

Figure 6:
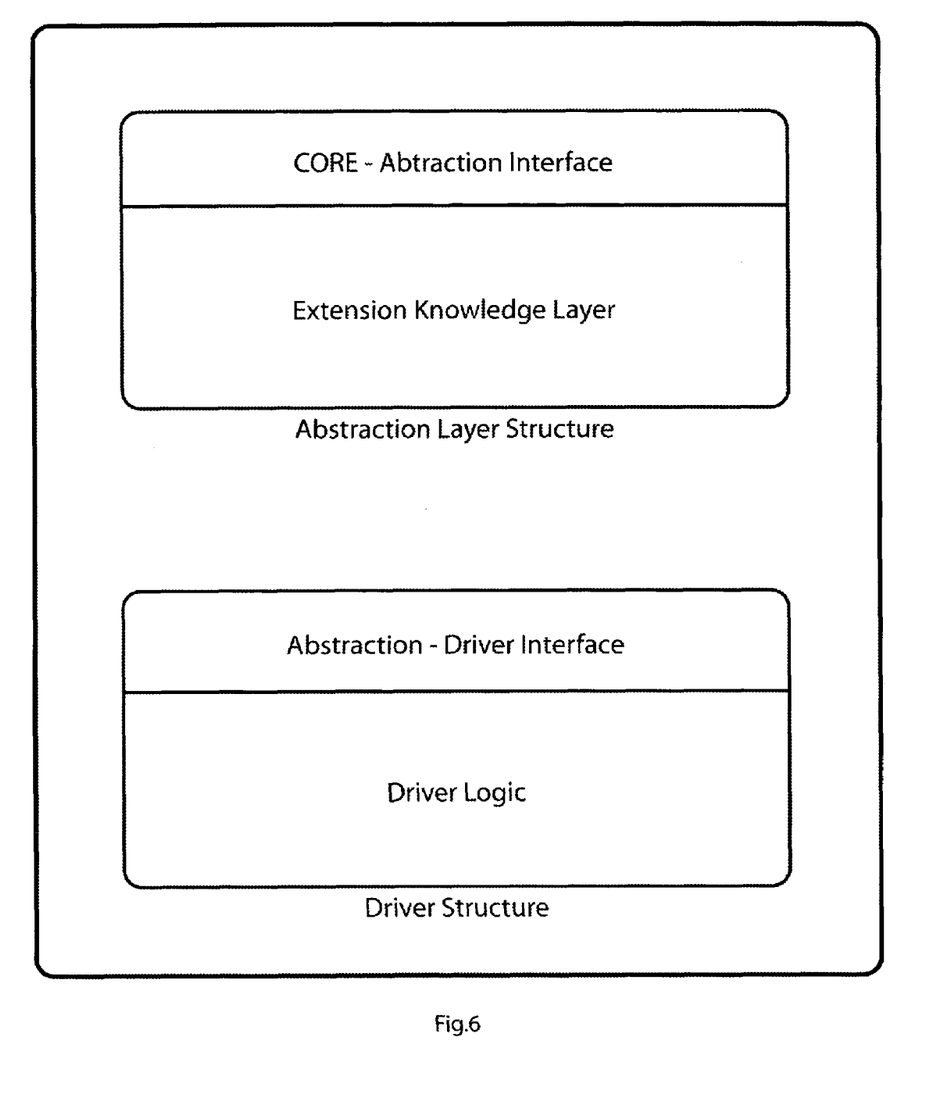
FIG. 6. Abstraction and Driver Layer Structure.

InterCORE Communication manager: Refers to the part of CORE that provides support for communication among several COREs. Since the different applications can be in the same computer or several computers interconnected in a network, the intercore communication manager must manage the network communication and protocol used to exchange information through a net. The extension''s abstraction layer is divided into two parts. These are (FIG. 6):CORE-Abstraction Interface: This part refers to the interface used to communicate an extension with the central CORE to which it belongs. It contains data structures, objects, methods, events, etc. that provides to CORE access to extension''s functionality, and to extensions the CORE management functions. Extension Knowledge Layer: This layer contains all logic and knowledge about the operation of extensions at a higher level than a driver, and it have certain knowledge about the other extensions connected to the same CORE. It''s hidden by the CORE-Abstraction Interface and makes calls directly to the abstraction-Driver Interface.

The extension''s driver layer is divided into two parts. The two parts are (FIG. 6): Abstraction-Driver interface: This interface provides a degree of abstraction to control a terminal device in a specific way. It provides the abstraction layer with control over terminal devices.

Driver Logic: It''s the logic itself that controls the terminal devices, and is hidden by the Abstraction-Driver Interface, interacting directly with terminal devices (hardware or software). The CORE Exchange Pipe is split into two different channels that provide support in order to perform messaging tasks between different COREs. It has a backward channel and a Forward channel that are relative to a particular CORE.

Operation of the Invention

The MAASA architecture is based on the premise that a system is a set of interacting terminal devices (databases, control networks, interfaces, etc). Each terminal device has a specific way of sending messages to other terminal devices to accomplish a shared task, and a way of requesting some needed data or synchrony signal between terminal devices. Anyone of them may perform a given task implicit in its nature; and when it needs the execution of task that it cannot carry out itself, it may send a message to an extension that can accomplish the needed task. The required extension sends back an acknowledge message, data message or structure indicating that the task has been done or that there has been an error in the process.

The extension layers and the CORE determine the interaction between terminal devices. The extension layer establishes a convention in order to talk to a specific terminal device, and provides a mechanism of interaction with other extensions. The CORE is an essential part of this mechanism; it contains all the rules that commands all interaction between extensions. The CORE delivers information between extensions through the InterExtension Communication & logic manager and passes it to the CORE Engine kernel that contains the intelligence engine configured with the respective intelligence plugin. The intelligence plugin provides the basic principles of interaction of extensions, i.e., the way in which they can exchange information, messages and signals. It contains all the logic and preprocessing ways, formats and extensions state.

The CORE also manages InterCORE communications. This type of communications is performed between different COREs of different applications through the CORE Exchange Pipe. Inter-application communication provides an easy integration of several applications in a whole, where they accomplish their particular work and delegate the foreign tasks to an application that can do such work properly. This messaging system between COREs has a prioritized way to propagate the information that contains a particular message.

When a CORE needs to perform an activity it sends a particular message that will be understood by the target CORE. This message must be in a specific protocol imposed by the intelligence plugin in the recipient CORE, i.e. each communication protocol is specific to an application and other applications must to communicate with it with the appropriate protocol. When an application receives a message, it is preprocessed, parsed and then delivered to the right extensions in order to perform one or various tasks in the target application. Afterwards, the extensions that performed the tasks respond with a success or failure message. All acknowledged messages received from the extensions are processed in order to compose an acknowledge message that will be sent to the source CORE that requested the actions. The InterCORE communication manager manages this entire process. When a terminal device is replaced by another of the same type, preserving the same extension, it''s necessary to change the driver of the extension for the new terminal device in order to support its particular way of operation. There is no need to change any other part of the architecture in the application.

When a new terminal device is added, it is necessary to construct a new extension that supports the terminal device and plugs it into the CORE. The CORE must be able to detect the new extension and ask for the required intelligence plugin to attend and process the requests and provide smart-capabilities to CORE, in order to properly handle the new extension.

Description and Operation of Alternative Embodiments

This model of software architecture can be used in the development of any type of software: military, commercial, web based, administrative, industrial, etc.

The following are only some clear examples: A Control and Automation Application (Access Control) and an Assets Control application, both fully integrated.

The Access Control application must have the following three extensions: Control Extension (terminal device: control network)Data Extension (terminal device: RDBMS) Interface Extension (terminal device: user)The Interface extension performs the requests coming from the user and shows the different responses that come from the CORE. The front end can be of any type, web based, java based, a visual basic interface, a C++ interface, etc. To replace the interface, only a driver change in the extension is needed. In this example the interface is web based.

The Data extension stores and retrieves all the data related to the system, providing other extensions the necessary information so that they can accomplish their tasks. This extension can support many terminal devices like several DBMS (relational, hierarchical), file managers like Microsoft Access, plain text managers, etc. In this particular case, we use a relational database management system, specifically Microsoft SQL Server.

The control network extension controls a series of devices connected through a specific control network. This control network can be Lon, CEBus, Blue Tooth, etc. In this particular case, Lon is used.

The system consists of three extensions interacting with one another to reach a main goal, namely, to perform a right control over access in a physical space. The interface extension allows users to enter several commands and configuration parameters that will be used by the other extensions. The final user utilizes the interface in order to give to system the adequate parameters, and the interface itself performs calls to the interface driver. The interface driver, in its turn, performs calls to the interface abstraction layer where they will be redirected to CORE in order to distribute the call to different tasks in the InterExtension Communication & logic manager and CORE Engine Kernel. The CORE splits the call in several calls to different applications. In this case, a configuration task will be performed, for which it''s necessary to record the configuration parameters or changes and to make the adequate changes in the control network. First, the changes will be written in the database. The CORE makes the correct calls to the database abstraction layer in order to register all data before any interaction with the control network. After the data is recorded in the database, it''s necessary to change the behavior of the control network agreed with the recorded data. When the data extension returns its answer of success or failure, the CORE decides to make or not to make a call to the Control network abstraction layer to do the right configuration jobs on the network.

In the opposite case, when a message comes from control network to the computer, it is received by the control network driver, then, is sent to the Control Network Abstraction Layer and, later, to the CORE that splits it into several calls; one writes the relevant data received, and the other filters and shows the data through the right interface.

The same occurs in an Assets Control Application. It has the same structure, the same number and type of extensions, and the same functioning.

When the access control system tries to communicate with the Assets Control system or vice versa, the incoming call in the source CORE comes from any extension attached to it. The CORE decides when the call needs to be split, and what calls will be generated. The resultant calls may be local calls or foreign calls or a mixture of both with a certain protocol to follow the different acknowledges. The foreign calls go into the CORE Exchange Pipe in the form of a message, and the target CORE in the target application receives it. When the message arrives, its priority is checked, it is converted into one or several calls, and executed at a proper time depending on its priority. After the execution of the different calls of the message, and an acknowledge response is constructed in order to be sent to the source CORE. When the source CORE receives this acknowledge message, it can decide its execution path taking care of the logic inside its intelligence plugin.

Conclusion, Ramifications, and Scope of Invention

Thus, the reader will see that the present model of architecture is designed to fulfill requirements of versatility, independence of terminal devices, high degree of inter-application integration, which solves all limitations of existing models. This comprehensive model can be used in any software system independently of the objectives of the system itself.

While our above description contains many specificities, these should not be construed as limitations to the scope of the invention, but rather as an exemplification of one preferred embodiment thereof. Obviously, modifications and alterations will occur to others upon a reading and understanding of this specification such as, for example, several possible variations to the presented example structure (access control) to include other example applications, several variations to the internal implementation of the architecture, especially to different choices to provide intelligence to a specific application. The description above is intended, however, to include all such modifications and alterations insofar as they come within the scope of the appended claims or the equivalents thereof.

What is claimed is:

1. A computerized method of a software architecture that provides high versatility and performance, the method comprising the steps of:

having two dimensions, an Application Dimension and a Complex Organizational Referee Engine Dimension;

relating the Application Dimension to the different applications and relating the Complex Organizational Referee Engine Dimension to the Application Dimension;

having a plurality of terminal devices;

having a Complex Organizational Referee Engine (CORE) which is a compound of software components that can accept different kinds of software extensions dynamically in a hot plug fashion, which manages task processing and task scheduling, manages information exchange between the two dimensions of the software architecture, manages the extension hot-plugging mechanism, and manages the exchange of information with other instances of itself within the Complex Organizational Referee Engine Dimension related and with a plurality of other Complex Organizational Referee Engines, wherein the CORE enabling communication between the different applications, providing both a mechanism and rules thereto;

having the Complex Organizational Referee Engine within the Complex Organizational Referee Engine dimension share information and integrate the software architecture; and having applications based on abstractions that are composed of drivers, abstraction layers and a unique Complex Organizational Referee Engine;

wherein said abstraction layers consists of a software layer that hides implementation detail and data structures of a specific software, and said software extensions are comprised of an abstraction layer and a driver.

2. The method of claim 1 in which said Complex Organizational Referee Engine Dimension consists of a plurality of Complex Organizational Referee Engines connected by a bidirectional communication means.

3. The method of claim 1 in which said CORE consists of three parts:

i) a Complex Organizational Referee Engine kernel, which manages the task processing and scheduling, manages the information exchange between the Complex Organizational Referee Engine Dimension, and manages different kinds of software extensions dynamically in a hot plug fashion;

ii) an InterExtensionCommunication and logic manager which manages the Complex Organizational Referee Engine's communication and tasks with a plurality of extensions; and iii) an InterComplex Organizational Referee Engine Communication manager which manages the Complex Organizational Referee Engine's communication with a plurality of other Complex Organizational Referee Engines.

4. The method of claim 1 in which the abstraction layer consists of two part:

i) a Complex Organizational Referee Engine Abstraction interface, which interfaces the software extension with the Complex Organizational Referee Engine; and ii) an Extension Knowledge Layer, which contains logic and knowledge about the operations of the software extensions.

5. The method of claim 1 in which includes the step of having an extension driver layer that consists of two parts:

i) an Abstraction-Driver interface, which interfaces the Abstraction layer with the terminal device; and ii) a Driver logic used to control the terminal device.

6. The method of claim 1 used for a Control and Automation Application.

7. The method of claim 1 used for an Assets Control application.

8. The method of claim 1 further comprising replacing the terminal device with a new terminal device consisting of adding the step of changing the driver for the software extension.

9. The method of claim 1 further comprising adding a new terminal device consisting of adding the steps of:

a) constructing a new software extension for the terminal device;

b) interfacing the new software extension into the Complex Organizational Referee Engine;

c) asking the Complex Organizational Referee Engine for the required data and information to handle the new software extension.

* * * * *